United States Patent

Curley, Jr. et al.

(10) Patent No.: US 8,029,221 B2
(45) Date of Patent: Oct. 4, 2011

(54) CAGE NUT ASSEMBLY

(75) Inventors: William J. Curley, Jr., Waterbury, CT (US); Anthony Pascariello, Southington, CT (US)

(73) Assignee: Illinois Tool Works, Inc., Glenview, IL (US)

( * ) Notice: Subject to any disclaimer, the term of this patent is extended or adjusted under 35 U.S.C. 154(b) by 514 days.

(21) Appl. No.: 12/350,352

(22) Filed: Jan. 8, 2009

(65) Prior Publication Data
US 2009/0245967 A1 Oct. 1, 2009

Related U.S. Application Data

(60) Provisional application No. 61/041,025, filed on Mar. 31, 2008.

(51) Int. Cl.
F16B 37/04 (2006.01)
F16B 11/00 (2006.01)

(52) U.S. Cl. ....... 411/82; 411/82.5; 411/111; 29/525.02

(58) Field of Classification Search .......... 411/111–113, 411/965, 999, 82, 82.2, 82.5, DIG. 2; 29/423, 29/426.4, 525.02; 156/711
See application file for complete search history.

(56) References Cited

U.S. PATENT DOCUMENTS

| 3,179,143 | A | * | 4/1965 | Schultz et al. | 411/82.2 |
| 3,678,980 | A | * | 7/1972 | Gutshall | 411/82.5 |
| 3,747,657 | A | * | 7/1973 | Ryder | 411/82 |
| 3,880,535 | A | * | 4/1975 | Durham et al. | 403/241 |
| 5,028,189 | A | * | 7/1991 | Harley | 411/108 |
| 5,154,793 | A | * | 10/1992 | Wojnarowski et al. | 156/711 |
| 5,630,686 | A | | 5/1997 | Billmann | |
| 5,756,185 | A | * | 5/1998 | Lesser | 428/192 |
| 5,976,307 | A | * | 11/1999 | Cook, Jr. | 156/701 |
| 6,644,902 | B1 | | 11/2003 | Cutshall | |
| 6,669,428 | B2 | * | 12/2003 | Autterson et al. | 411/531 |
| 6,692,206 | B1 | | 2/2004 | Clinch et al. | |
| 7,086,817 | B2 | * | 8/2006 | Clinch et al. | 411/111 |
| 2004/0005205 | A1 | | 1/2004 | Yake et al. | |
| 2004/0013492 | A1 | | 1/2004 | Clinch et al. | |
| 2004/0033121 | A1 | | 2/2004 | Clinch et al. | |
| 2004/0042868 | A1 | | 3/2004 | Yake et al. | |
| 2004/0091333 | A1 | | 5/2004 | Clinch et al. | |
| 2004/0109739 | A1 | | 6/2004 | Clinch et al. | |
| 2004/0136805 | A1 | | 7/2004 | Miller et al. | |
| 2004/0228700 | A1 | | 11/2004 | Clinch et al. | |
| 2005/0258045 | A1 | | 11/2005 | Yake et al. | |
| 2007/0183863 | A1 | | 8/2007 | Blackaby | |
| 2007/0243039 | A1 | | 10/2007 | Johnson et al. | |

FOREIGN PATENT DOCUMENTS

DE 102005044462 A1 3/2007
WO WO 2008020036 A 2/2008

\* cited by examiner

OTHER PUBLICATIONS

International Search Report and Written Opinion for PCT/US2009/031420, Jun. 3, 2009.

*Primary Examiner* — Flemming Saether
(74) *Attorney, Agent, or Firm* — Mark W. Croll; Paul E. Donovan

(57) ABSTRACT

A cage nut assembly includes a cage, a nut and a heat sensitive adhesive. The cage includes a plurality of walls defining an internal chamber and an open end. An opening is formed through one of the walls. The nut is secured to the cage within the internal chamber. The nut includes a threaded channel exposed through the opening. The heat sensitive adhesive adhesively secures the nut to the cage within the internal chamber. The nut breaks away from the cage within the internal chamber when heat is applied to the heat sensitive adhesive.

16 Claims, 8 Drawing Sheets

CAGE NUT ASSEMBLY

RELATED APPLICATIONS

This application relates to and claims priority benefits from U.S. Provisional Patent Application No. 61/041,025 entitled "Cage Nut Assembly," filed Mar. 31, 2008, which is hereby incorporated by reference in its entirety.

FIELD OF EMBODIMENTS OF THE INVENTION

Embodiments of the present invention generally relate to a fastening assembly, and more particularly, to a fastening assembly including a nut positioned within a cage housing, thereby forming a cage nut assembly

BACKGROUND

Cage nut assemblies are used in various applications, such as with respect to vehicles. For example, a cage nut assembly may be positioned on a vehicle frame that is to be coated with paint. Typically, the nut remains over the frame until the coating process is completed so that the layer of paint covers all, or substantially all, of the frame. Coating the frame in this manner minimizes corrosion. After the coating process is complete, the nut may be torqued toward the vehicle frame to provide a secure connection between the frame and another component, such as a door panel.

FIGS. 1 and 2 illustrate isometric top and bottom views, respectively, of a conventional cage nut 10. A similar cage nut is shown and described in U.S. Pat. No. 6,644,902, entitled "Cage-Nut Assembly."

Referring to FIGS. 1-2, the cage nut 10 includes a cage 12 having a nut 14 positioned within an internal chamber 16. A plurality of fingers 18 support the nut 14 within the cage 12. In particular, the nut 14 is suspended above bottom edges 20 of the cage 12. In this position, a top surface 22 of the nut 14 may abut into an internal surface of a top wall 24 of the cage 12. The cage 12 also includes a central opening 26 formed through the top wall 24 that allows a threaded opening 28 of the nut 14 to be exposed.

When a fastener, such as a screw or bolt (not shown) is inserted into the threaded opening 28 of the nut 14 and tightened toward the nut 14, the nut 14 is forced downward (as shown in FIG. 1) in the direction of arrow A. During this movement, the fingers 18 are spread open as the cage 12 continues to be forced in the direction of arrow A, thereby allowing the nut 14 to be forced toward a surface of a component, such as a vehicle frame.

The fingers 18 of the cage 12 sometimes bend, however, when the cage 12 and the nut 14 are assembled together. For instance, when a bolt is inserted into the threaded opening 28, the fingers 18 may inadvertently bend, thereby allowing the nut to prematurely drop within the cage 12.

Moreover, the fingers 18 may block movement and hinder proper alignment of the nut 14 when a user forces the nut 14 into position over a structure. That is, the fingers 18 may hinder movement of the nut 14 when a user actually intends to move the nut 14 into a proper position on a structure.

SUMMARY OF EMBODIMENTS OF THE INVENTION

Certain embodiments of the present invention provide a cage nut assembly including a cage, a nut and a heat sensitive adhesive. The cage includes a plurality of walls defining an internal chamber and an open end. An opening may be formed through one of the walls. The nut is secured to the cage within the internal chamber. The nut includes a threaded channel exposed through the opening. The heat sensitive adhesive adhesively secures the nut to the cage within the internal chamber, wherein the nut breaks away from the cage within the internal chamber when heat is applied to the heat sensitive adhesive.

The cage may include a tab secured to at least one of the walls. The tab extends over the open end. The cage may also include at least one weld nib extending from at least one of the walls. The cage may be devoid of any protrusions, such as fingers or legs, within the internal chamber.

The heat sensitive adhesive may be glue. For example, the heat sensitive adhesive may be a glue layer coating a surface of one or both of the nut and/or cage. Optionally, the adhesive may be a plurality of beads of glue.

Certain embodiments of the present invention provide a method of securing a nut to a coated structure. The method includes applying a heat sensitive adhesive to a surface of one or both of a nut and a cage, positioning the nut within an internal chamber of the cage, aligning a threaded channel of the nut with an opening formed in a wall of the cage, sandwiching the heat sensitive adhesive between the nut and the cage, wherein the sandwiching securely bonds the nut to the cage, securing the cage to a structure, applying a coating to the structure, heating the heat sensitive adhesive in order to break the bond between the nut and the cage, and dropping the nut to a free floating position on the structure through the heating. The method may also include prying a tab extending from the cage back in order to gain access to the nut within the internal chamber.

Figure 1:
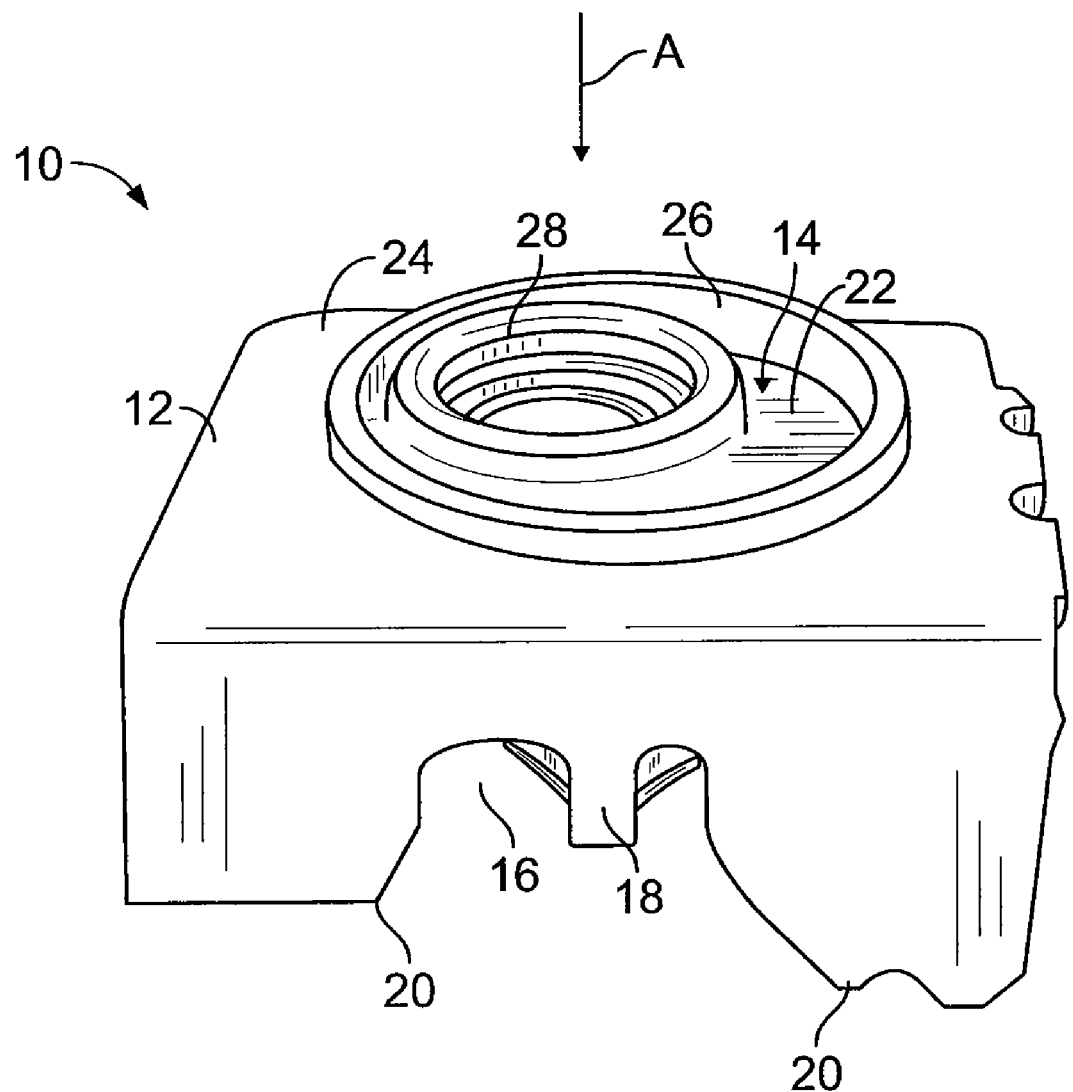
FIG. 1 illustrates an isometric top view of a conventional cage nut.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE INVENTION

Figure 3:
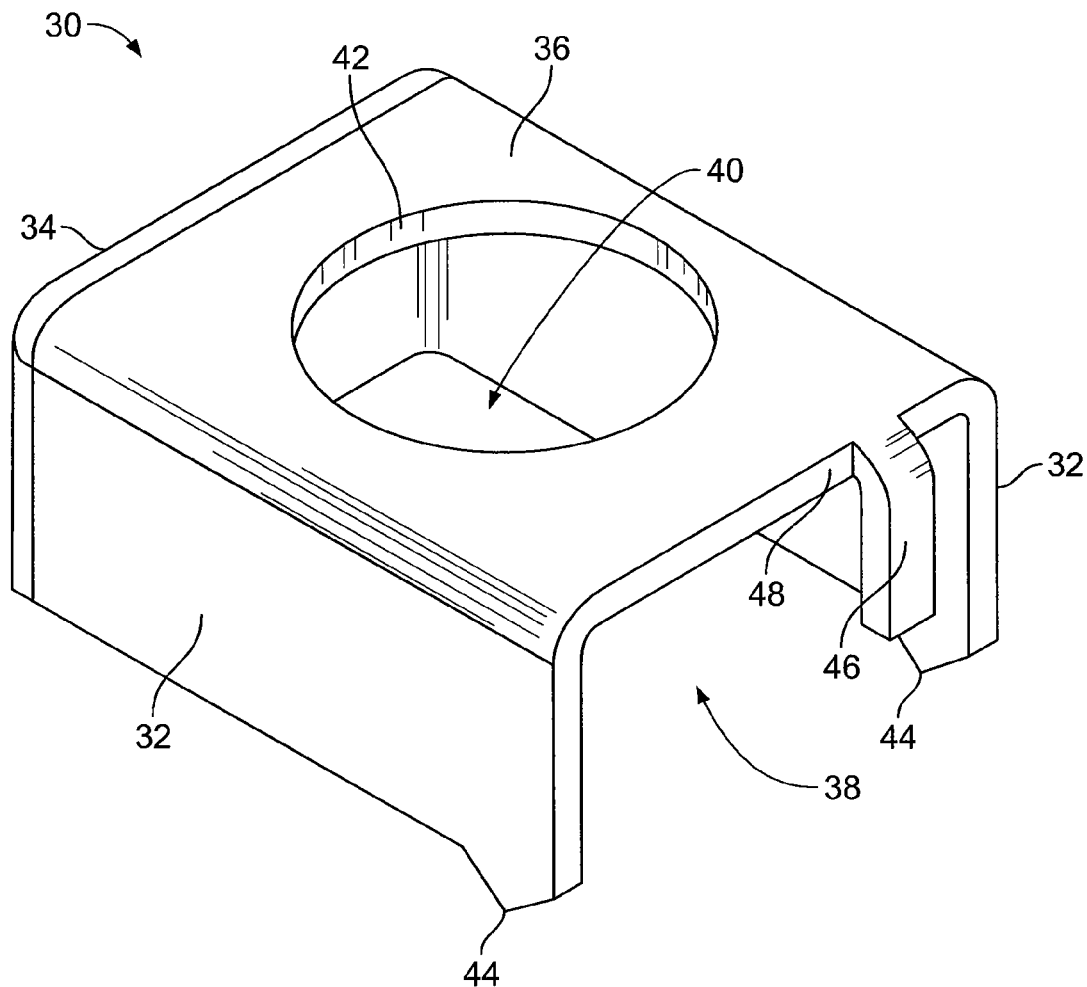
FIG. 3 illustrates an isometric top view of a cage, according to an embodiment of the present invention.

FIG. 3 illustrates an isometric top view of a cage 30, according to an embodiment of the present invention. The cage includes lateral walls 32 integrally connected to a rear wall 34 and top wall 36. The walls 32, 34 and 36 define an open front 38 that leads to an internal chamber 40.

An opening 42 is formed through the top wall 36. The opening 42 may be circular, as shown in FIG. 3, or various other shapes.

Weld nibs 44 extend downwardly from lower front edges of the lateral walls 32. A weld nib 44 may also extend downwardly from the rear wall 34, as well. More or less weld nibs 44 than those shown may be used. Further, the weld nibs 44 may be located at different positions. The weld nibs 44 are configured to be welded to a structure, such as a frame of a vehicle.

A tab 46 extends downwardly from a front edge 48 of the top wall 36. The tab 46 extends over a portion of the open front 38 and is configured to ensure that a nut does not eject from the internal chamber.

Figure 4:
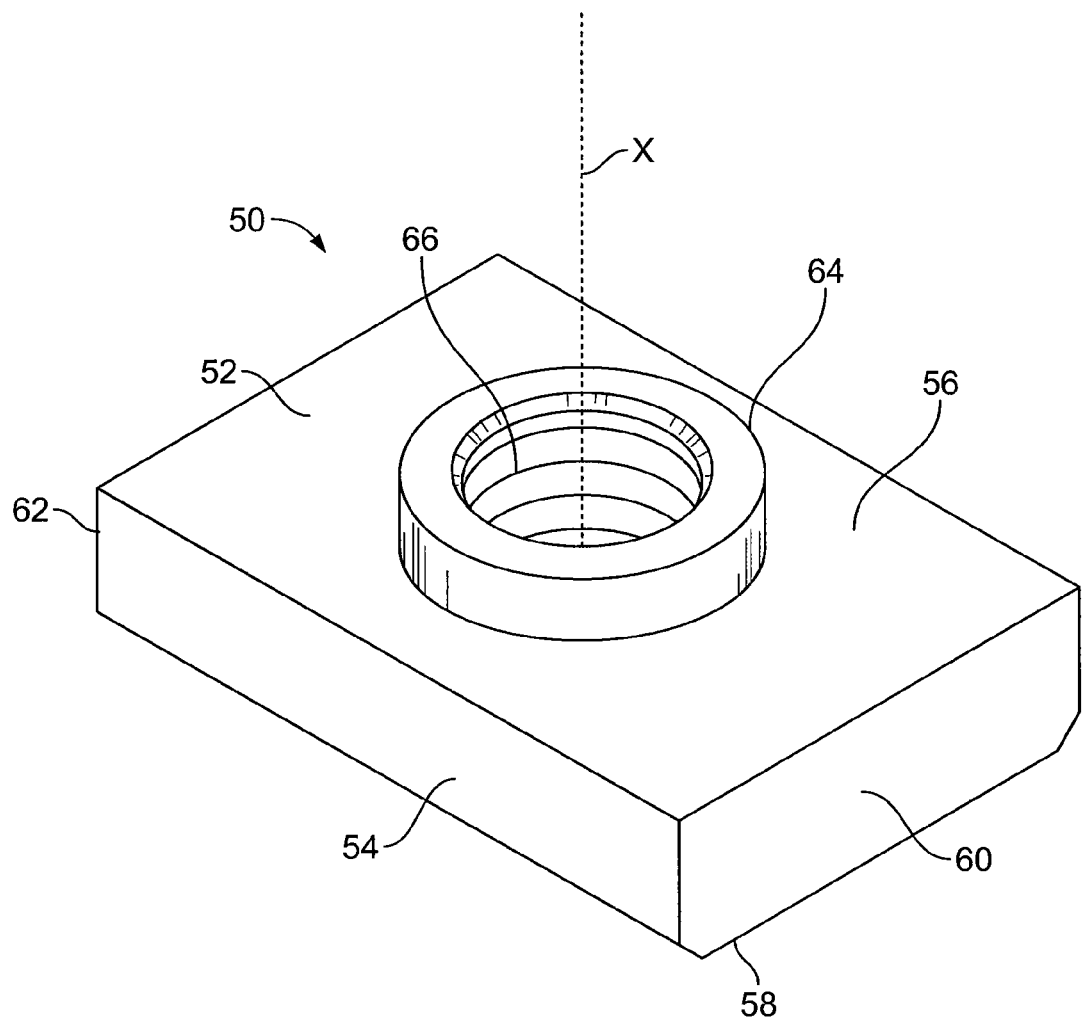
FIG. 4 illustrates an isometric top view of a nut, according to an embodiment of the present invention.

FIG. 4 illustrates an isometric top view of a nut 50, according to an embodiment of the present invention. The nut 50 includes a main body 52 having lateral edges 54 integrally formed with top and bottom surfaces 56, 58 and front and rear edges 60, 62.

A central column 64 extends upwardly from the top surface 56. The central column 64 defines an internal threaded channel 66 that passes through the main body 52 about a central axis X. The threaded channel 66 is configured to receive and retain a bolt or screw (not shown).

The entire nut 50 may be coated with Teflon. Alternatively, just the top surface 56 and/or the threaded channel 66 may be coated with Teflon.

Figure 5:
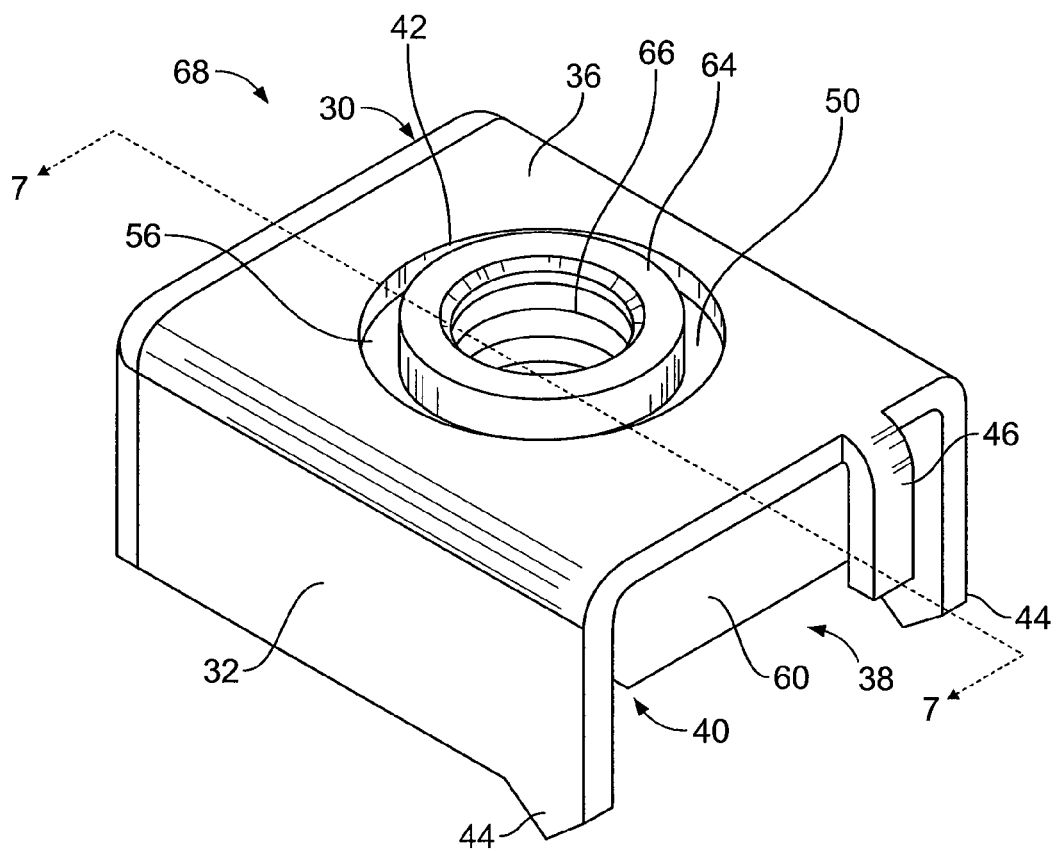
FIG. 5 illustrates an isometric top view of a cage nut assembly, according to an embodiment of the present invention.
Figure 6:
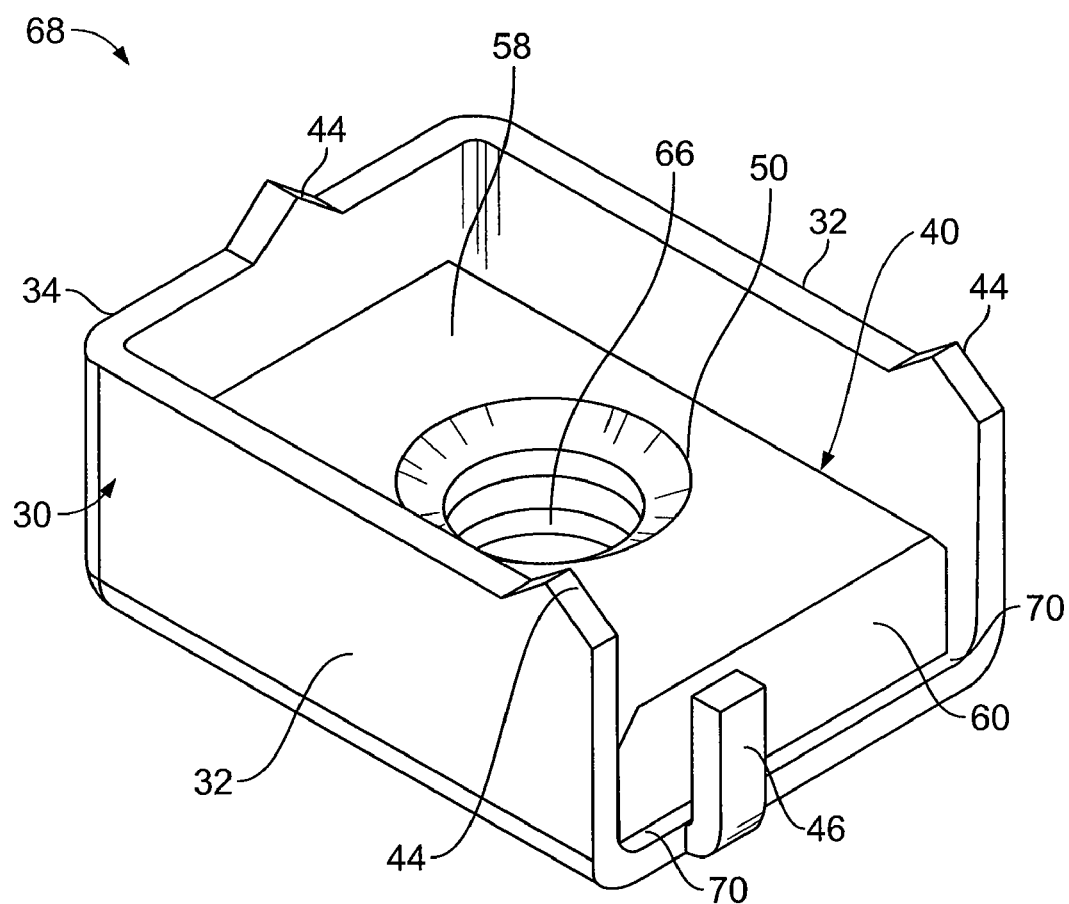
FIG. 6 illustrates an isometric bottom view of a cage nut assembly, according to an embodiment of the present invention.

FIGS. 5 and 6 illustrate isometric top and bottom views, respectively, of a cage nut assembly 68, according to an embodiment of the present invention. Referring to FIGS. 5 and 6, the cage nut assembly 68 includes the cage 30 and the nut 50. The top surface 56 of the nut 50 is secured to an underside 70 of the top wall 36 of the cage 30 through a heat sensitive adhesive that adhesively bonds the nut 50 to the cage 30. The heat sensitive adhesive may be a glue, such as a conventional glue or that used in glue cartridges in hot glue guns. Further the heat sensitive adhesive may be a layer that blankets over the top surface 56 of the nut 50 around the central column 64. The heat sensitive adhesive may be directly applied to the top surface 56 of the nut 50 and/or the underside of the top wall 36 of the cage 30.

In order to secure the nut 50 to the cage 30, the nut 50 is placed in the internal chamber 40 so that the central column 64 is aligned with the opening 42. Because the opening 42 has a greater diameter than the central column 64, the central column 64 is able to pass into the opening 42.

Once aligned, the central nut 50 is urged toward the top wall 36 of the cage 30. Once the top surface 56 of the nut 50 contacts the underside 70 of the top wall 36 of the cage 30, the heat sensitive adhesive adhesively bonds the nut 50 to the cage 30. In this position, the column 64 of the nut 50 is positioned in and/or through the opening 42 formed in the top wall 36 of the cage 30. The tab 46 provides a barrier that ensures that the nut 30 does not slip through the open front 38 of the cage 30 during the securing process.

Figure 7:
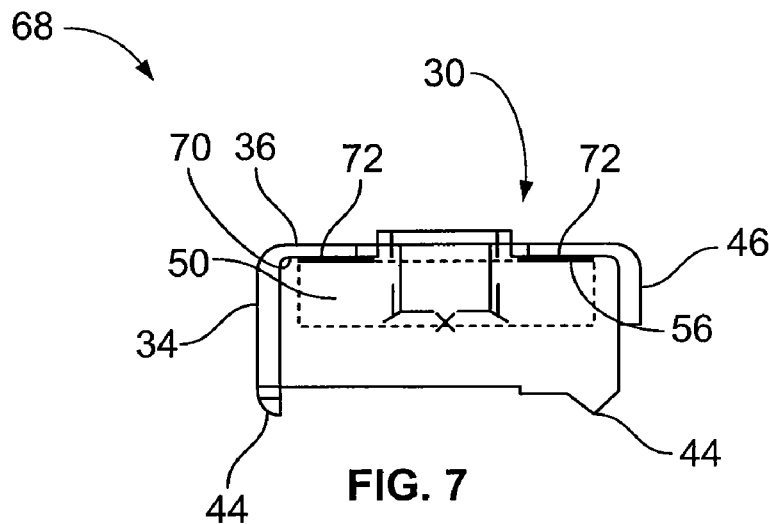
FIG. 7 illustrates a cross-sectional view of a cage nut assembly through line 7-7 of FIG. 5, according to an embodiment of the present invention.
Figure 8:
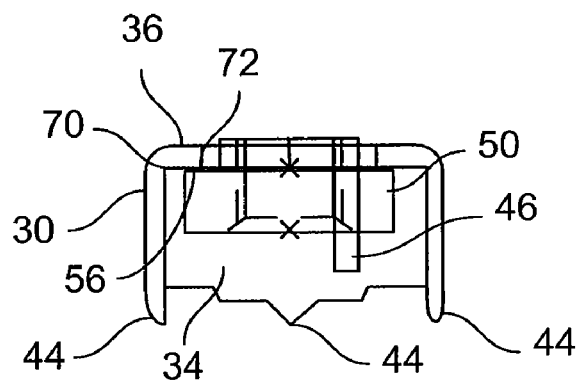
FIG. 8 illustrates a front view of a cage nut assembly, according to an embodiment of the present invention.

FIG. 7 illustrates a cross-sectional view of the cage nut assembly 68 through line 7-7 of FIG. 5. FIG. 8 illustrates a front view of the cage nut assembly 68. As shown in FIGS. 7-8, the heat sensitive adhesive 72 may be a layer of glue interposed between the top surface 56 of the nut 50 and the underside 70 of the top wall 36 of the cage 30. Alternatively, the heat sensitive adhesive 72 may include a plurality of glue beads, instead of a blanketing layer. The heat sensitive adhesive 72 adhesively secures the nut 50 to the cage 30.

Figure 2:
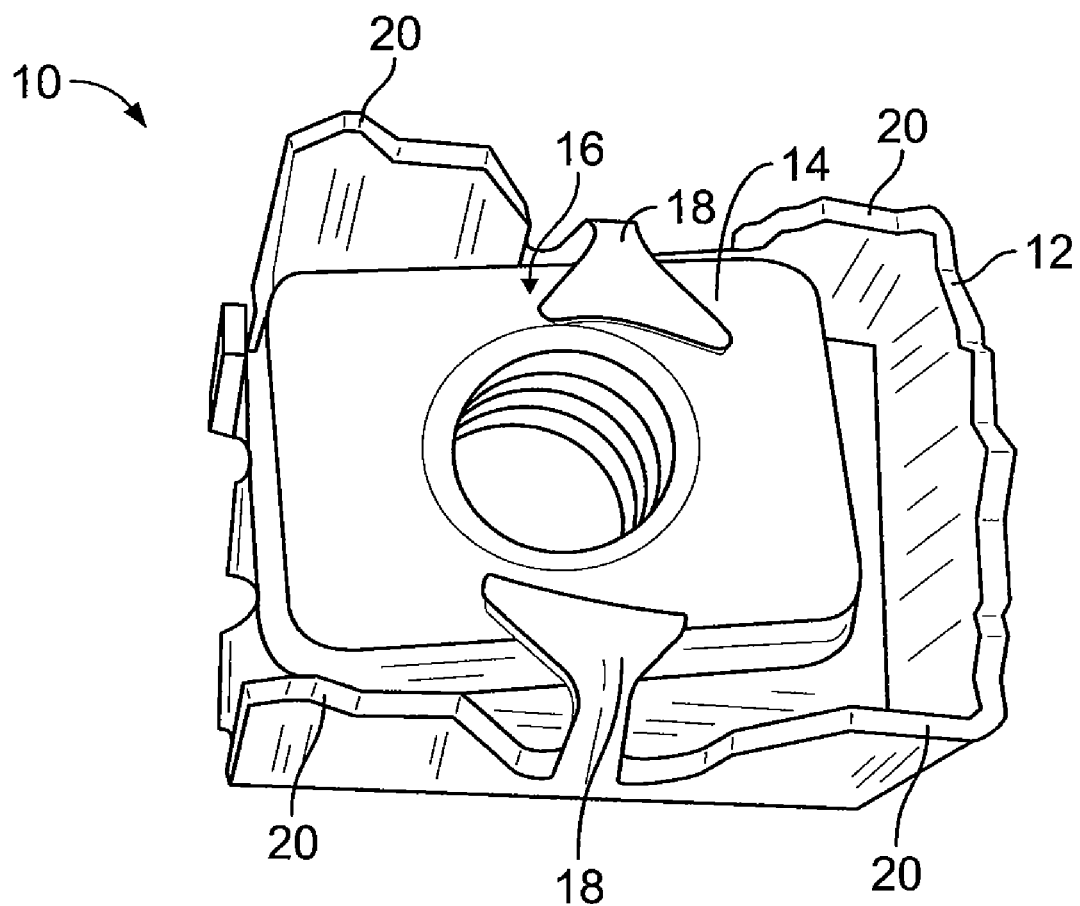
FIG. 2 illustrates an isometric bottom view of a conventional cage nut.
Figure 9:
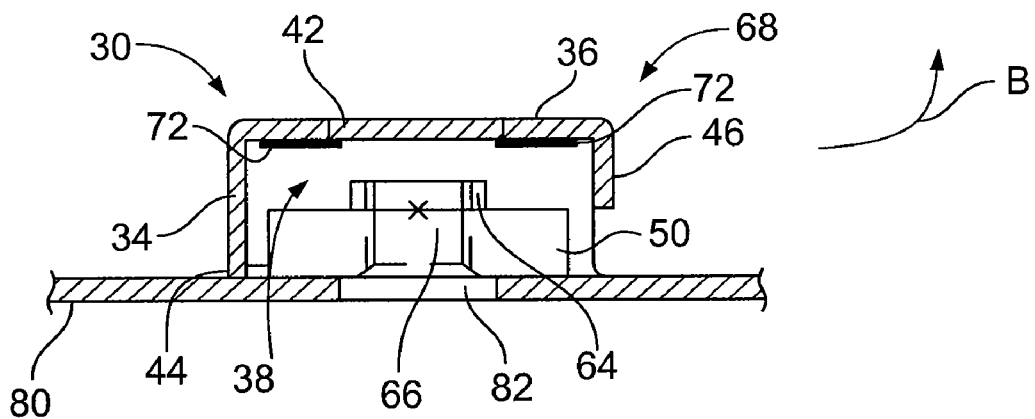
FIG. 9 illustrates a transverse cross-sectional view of a cage nut assembly secured to a structure, according to an embodiment of the present invention.

FIG. 9 illustrates a transverse cross-sectional view of the cage nut assembly 68 secured to a structure 80, according to an embodiment of the present invention. The cage 30 has been welded to a surface of the structure 80 at the weld nibs 44. Once the cage 30 is secured to the structure 80, heat may be applied to the cage nut assembly 68, such as through a heat lamp. The heat sensitive adhesive 72 is configured to melt at a desired temperature, such as 100° F. When the heat sensitive adhesive 72 melts, the bond between the nut 50 and the cage 30 breaks, and the nut 50 then drops to the surface of the structure 80 above a fastener through-hole 82. Thus, unlike the conventional cage nut 10 shown in FIGS. 1 and 2, the cage nut assembly 68 does not include retaining legs or fingers that are susceptible to premature bending and/or interfering with the nut 50 as it drops to its free floating position within the cage 30.

The tab 46 may be bent away from the internal chamber 38 in the direction of arrow B. That is, a user may use a tool to pry the tab 46 back, thereby allowing access to the internal chamber. This feature allows a user to quickly change the nut 50 for maintenance, or in case of a cross-threading problem. The tab 46 may be bent in the direction of arrow B and the nut 50 may then be removed. A new nut may then be inserted, and the tab 46 is then bent back to its original position.

During a paint coating process, for example, the cage nut assembly 68 is positioned on structure 80, such as a vehicle frame. The cage 30 may be welded to the structure 80. In order to ensure that the paint covers all, or substantially all, of the structure 80, the coating process occurs before the nut 50 is secured onto the structure 80. After the coating process, heat may be applied to the top of the cage nut assembly 68 in order to melt the heat sensitive adhesive 72. As the heat sensitive adhesive 72 melts, the bond between the nut 50 and the cage 30 breaks, and the nut 50 moves toward the structure, uninhibited by structures that protrude into the internal chamber 38.

Figure 10:
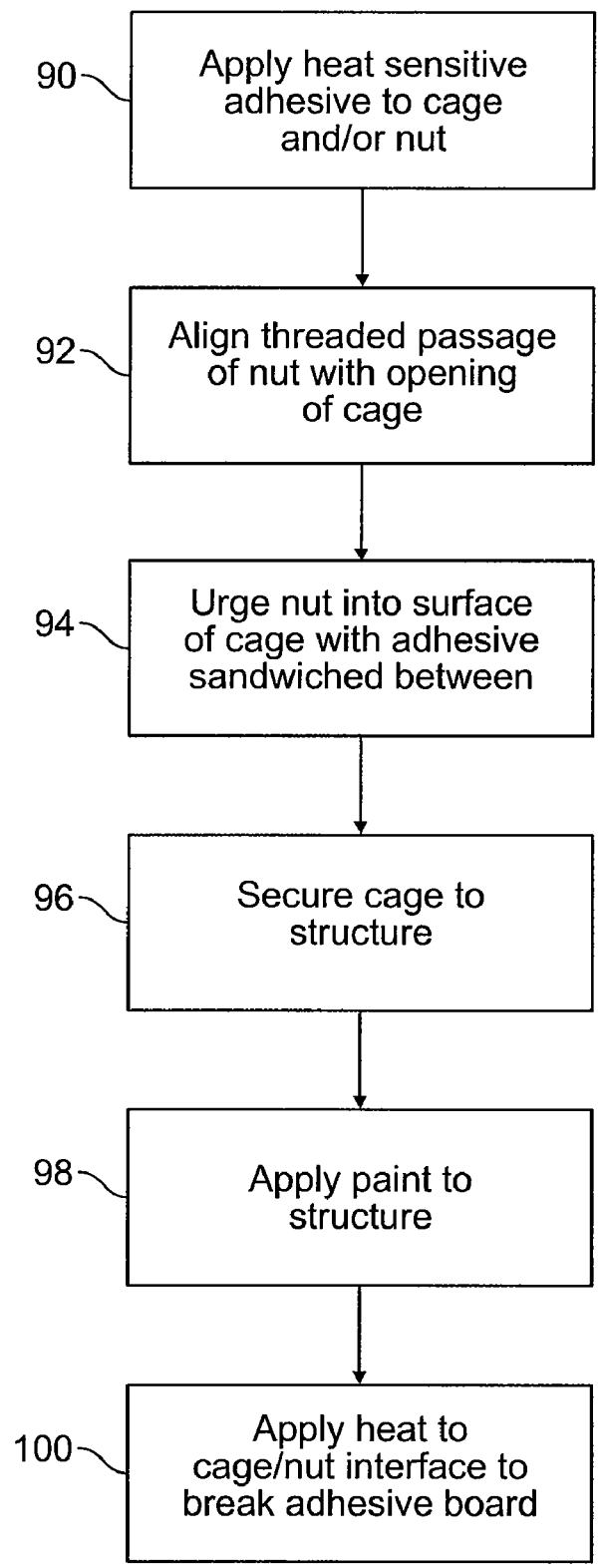
FIG. 10 illustrates a flow chart of a method of securing a cage nut assembly to a structure, according to an embodiment of the present invention.

FIG. 10 illustrates a flow chart of a method of securing a cage nut assembly to a structure, according to an embodiment of the present invention. At 90, a heat sensitive adhesive is applied to a top surface of a nut and/or an underside of a top wall of a cage. Then, at 92, a threaded passage of a nut is aligned with an opening formed through the top wall of the cage. The nut is then urged into the underside of the top wall of the cage, at 94, such that the adhesive is sandwiched between the top wall of the cage and the top surface of the nut.

The cage is then secured to a structure at 96, such as through welding. A coating of paint may then be applied to the structure at 98. Then, in order to allow the nut to move onto the structure, heat is applied to the cage/nut interface in order to break the adhesive bond.

Embodiments of the present invention provide a cage nut assembly that does not require one or more fingers or legs to keep the nut in a secured position with respect to the cage. Thus, unlike conventional cage nuts, the embodiments of the present invention are not susceptible to a nut inadvertently dropping due to the fingers prematurely bending. Further, embodiments of the present invention do not include obtrusions, such as fingers, within an internal chamber of a cage that hinder proper movement and alignment of the nut onto a structure.

While various spatial and directional terms, such as top, bottom, lower, mid, lateral, horizontal, vertical, front and the like may used to describe embodiments of the present invention, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

The invention claimed is:

1. A cage nut assembly comprising:
   a cage comprising a plurality of walls defining an internal chamber and an open end, wherein an opening is formed through one of said plurality of walls;
   a nut secured to said cage within said internal chamber, said nut comprising a threaded channel exposed through said opening; and
   a heat sensitive adhesive adhesively securing said nut to said cage within said internal chamber, the heat sensitive adhesive is located on a surface between the cage and the nut wherein said nut breaks away from said cage within said internal chamber when heat is applied to said heat sensitive adhesive.

2. The assembly of claim 1, wherein said cage comprises a tab secured to at least one of said plurality of said walls, wherein said tab extends over said open end.

3. The assembly of claim 1, wherein said cage comprises a plurality of weld nibs extending from at least one of said plurality of said walls.

4. The assembly of claim 1, wherein said cage is devoid of any protrusions within said internal chamber that are configured to secure said nut within said internal chamber.

5. The assembly of claim 1, wherein said heat sensitive adhesive comprises glue.

6. The assembly of claim 1, wherein said heat sensitive adhesive is a layer coating a surface of one or both of said nut and/or said cage.

7. The assembly of claim 1, wherein said heat sensitive adhesive comprises a plurality of beads of glue.

8. A method of securing a nut to a coated structure, the method comprising:
   applying a heat sensitive adhesive to a surface of one or both of a nut and a cage;
   positioning the nut within an internal chamber of the cage;
   aligning a threaded channel of the nut with an opening formed in a wall of the cage;
   sandwiching the heat sensitive adhesive between the nut and the cage, wherein said sandwiching securely bonds the nut to the cage;
   securing the cage to a structure;
   applying a coating to the structure;
   heating the heat sensitive adhesive in order to break the bond between the nut and the cage; and
   dropping the nut to a free floating position on the structure through said heating.

9. The method of claim 8, comprising prying a tab extending from the cage back in order to gain access to the nut within the internal chamber.

10. The method of claim 8, wherein the heat sensitive adhesive comprises glue.

11. The method of claim 8, wherein the heat sensitive adhesive is a layer coating a surface of one or both of the nut and/or the cage.

12. The method of claim 8, wherein the heat sensitive adhesive comprises a plurality of beads of glue.

13. A cage nut assembly comprising:
   a cage comprising: (i) a plurality of walls defining an internal chamber and an open end, (ii) a tab secured to at least one of said plurality of said walls, and (iii) a plurality of weld nibs extending from at least one of said plurality of said walls, wherein said tab extends over said open end, wherein an opening is formed through one of said plurality of walls;
   a nut secured to said cage within said internal chamber, said nut comprising a threaded channel exposed through said opening; and
   a heat sensitive adhesive adhesively securing said nut to said cage within said internal chamber, the heat sensitive adhesive is located on a surface between the cage and the nut wherein said nut breaks away from said cage within said internal chamber when heat is applied to said heat sensitive adhesive, wherein said cage is devoid of any protrusions within said internal chamber that are configured to secure said nut within said internal chamber.

14. The assembly of claim 13, wherein said heat sensitive adhesive comprises glue.

15. The assembly of claim 13, wherein said heat sensitive adhesive is a layer coating a surface of one or both of said nut and/or said cage.

16. The assembly of claim 13, wherein said heat sensitive adhesive comprises a plurality of beads of glue.

* * * * *